Dec. 23, 1952          W. TAMMINGA          2,622,772
MILK DELIVERY CAN WITH ENCLOSED DISPENSING TUBE
Filed Nov. 15, 1949          2 SHEETS—SHEET 1
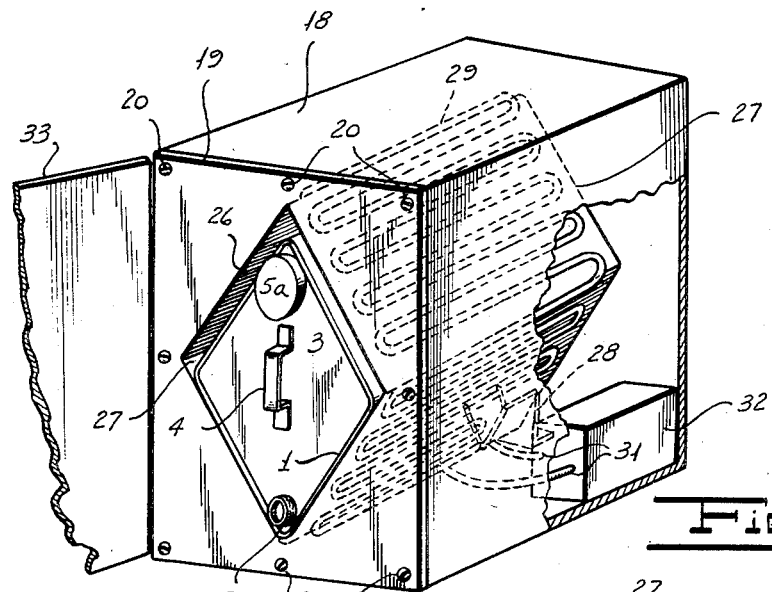
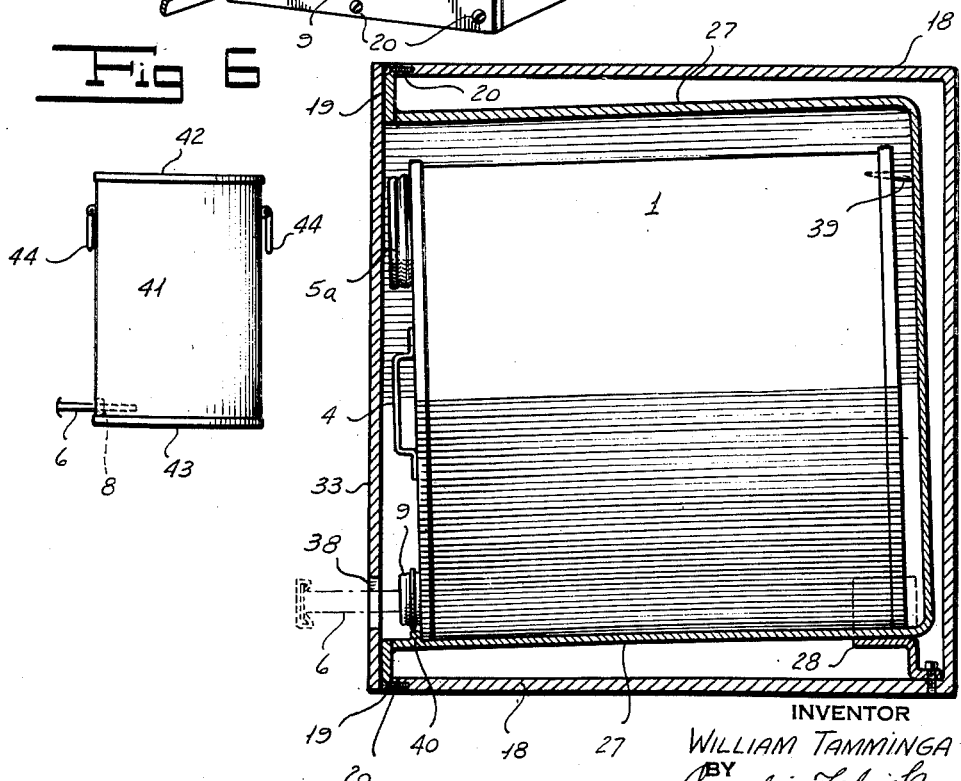
INVENTOR
WILLIAM TAMMINGA
BY Cornelius Zabriskie
ATTORNEY

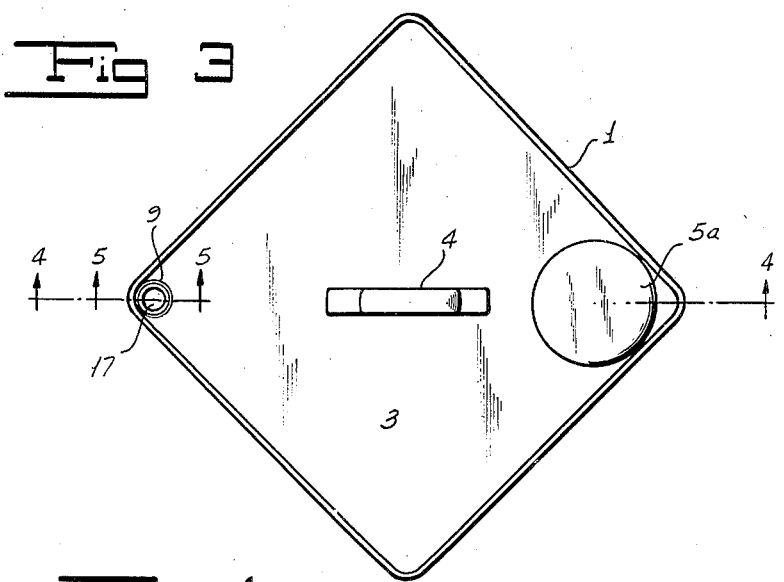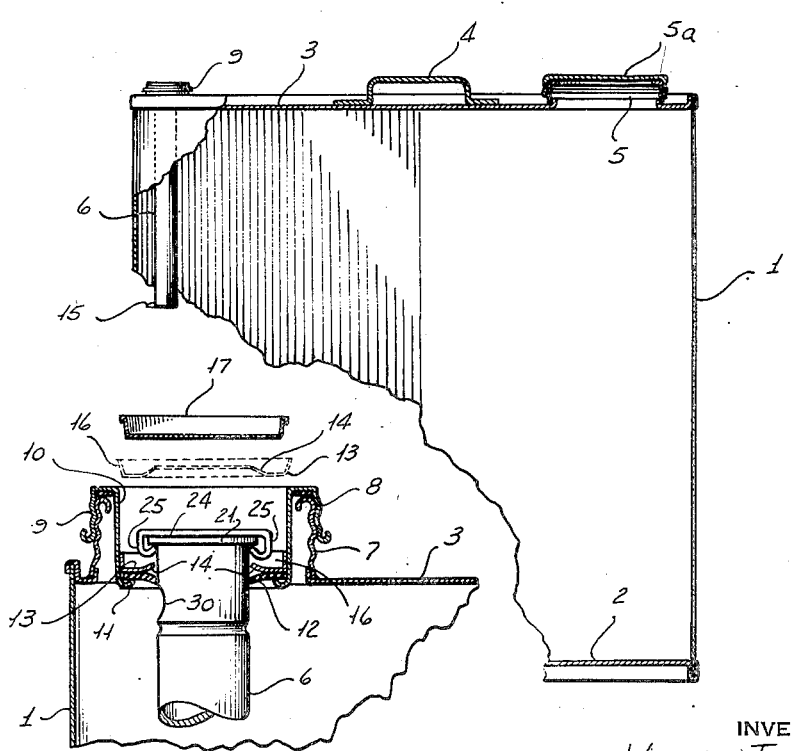

Patented Dec. 23, 1952

2,622,772

UNITED STATES PATENT OFFICE 2,622,772

MILK DELIVERY CAN WITH ENCLOSED DISPENSING TUBE

William Tamminga, Goshen, N. Y., assignor to Monitor Process Corporation, Jersey City, N. J., a corporation of New Jersey Application November 15, 1949, Serial No. 127,389

3 Claims. (Cl. 222—522)

This invention relates to the dispensing of milk from a bulk container into drinking glasses for individual consumption.

My prior patent No. 2,186,083, dated January 9, 1940, (Cl. 221—67) illustrates an apparatus for dispensing milk from conventional milk delivery cans, for example, the 40 quart variety, the can being supported in upright position within a cabinet provided with dispensing mechanism through which milk may be drawn, at the will of the operator, into drinking glasses.

The apparatus of said patent is highly efficient in handling the dispensing of milk from a conventional milk delivery can and has gone into extensive use on land, but does not meet all the requirements of seagoing vessels. Such ships are frequently at sea for weeks at a time and, when conventional milk delivery cans are utilized in this commerce, the empty cans are in such bad condition at the end of a voyage that they very frequently have to be taken apart and entirely rebuilt and retinned due to rust and corrosion, because persons in charge of milk dispensing will not properly wash out and clean the cans after they have been emptied.

Consequently it has become the practice to package milk for seagoing vessels in five gallon cans, adapted for a single use. These cans are generally of rectangular form and are provided with a screw cap. They are shipped in filled condition and stored on the vessel under refrigerated conditions until use. The milk in the can is then manually poured into pitchers by removing the screw top and tilting the can and, when a can is empty, it is thrown overboard. The milk is poured from the pitcher into drinking glasses. This practice of serving milk is unsanitary and altogether undesirable and there has long been a definite need for some satisfactory dispensing unit whereby milk could be dispensed by the glassful directly from these five gallon containers while the milk remaining in the container is kept cool and palatable. The present invention provides a satisfactory solution of this problem.

In carrying out the present invention, I provide these rectangular single use cans with an additional screw cap outlet and locate such outlet at one corner of the top wall of the can and in this outlet I install a milk discharge tube, such as is disclosed in my Patent No. 2,186,083 aforesaid. The milk discharge tube is mounted in the can in a novel and efficient manner by a structural arrangement of very low cost, so as not to materially add to the cost of single service cans as previously constructed. In addition, I provide a dispensing cabinet to support the rectangular can in tilted, on edge, position in a refrigerating compartment of novel construction, hereinafter more fully described, so that the milk may be maintained in cool sanitary condition and dispensed from time to time into drinking glasses as in my said prior patent. Through the use of this invention, contamination of the milk is minimized and the serving of such milk in an efficient manner is made possible.

The present invention is primarily directed to the dispensing of milk from single use rectangular cans, but certain features of the invention, relating more particularly to the structure of the can, are useful in dispensing milk from five gallon single use cylindrical cans of which some are used in the shipping trade.

Features of the invention, other than those adverted to, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Fig. 1 shows a milk dispenser according to the present invention, illustrating a can in position therein. The figure is a perspective view with a portion of the outer casing and a portion of the door broken away in the interest of clearness.

Fig. 2 is a longitudinal vertical section through the assembly of Figure 1.

Fig. 3 is a plan view of a rectangular single use can equipped with the dispensing tube of the present invention.

Fig. 4 is a section in the plane of the line 4—4 of Fig. 3, with certain parts shown in elevation.

Fig. 5 is an enlarged fragmental detail section on the line 5—5 of Fig. 3.

Fig. 6 is a side elevation of a cylindrical single use can equipped with the discharge tube of this invention.

In Figs. 3, 4 and 5 I have shown a conventional rectangular single use can equipped with the discharge tube of the present invention. The can has rectangular side walls 1, a bottom wall 2, and a top wall 3. The top wall 3 is provided with a handle 4 whereby it may be conveniently transported and at one corner of the top, it has the conventional threaded neck 5 adapted to be closed by a screw cap 5a. The opening 5 is ordinarily about three inches in diameter, so as to facilitate the expeditious filling of the can.

In associating the present invention with this conventional can the corner of the top of the can opposite the opening 5 is provided with a much smaller threaded neck 7 having a threaded cup 8 which may be conveniently stamped from sheet metal. This cup has a peripheral skirt 9 to screw on to the threaded neck 7 and is formed with coaxially cylindrical body 10 having, at its lower end, an inturned flange 11 (Fig. 5). A rubber sealing ring 12 is to be seated upon the flange 11 and clamped to this seat by a metal locking ring 13. The inner periphery of this ring is flared upwardly, as shown at 14, to provide an opening slightly larger than the discharge tube 6 adapted to be passed therethrough. The outer margin of the ring 13 is in the form of an upturned flange 16 which is flared out slightly with the diameter of the base of the flare approximately identical with the inner diameter of the cylindrical body 10. After the rubber sealing ring 12 has been seated on the flange 11, the metal ring 13 is forced down into the cylindrical portion 10 with sufficient power to spring the flange 16 thereof into the confines of the cylindrical body and form a forced fit therewith. When the locking ring 13 is thus forced into engagement with the rubber sealing ring 12, this latter ring will be firmly seated against the upturned end of the flange 11 and clamped between this flange and the locking ring 13 to form therewith a leak-proof joint.

The central opening in the rubber sealing ring 12 is of somewhat less diameter than the diameter of the discharge tube 6, so that when the tube is forced downwardly through the sealing ring 12, this ring will tightly embrace the tube and be deflected in a downward direction, as shown in Fig. 5, to provide a substantially air and liquid proof seal. When the tube is pulled upwardly to permit of the dispensing of milk, as hereinafter described, the deflection of the ring may be reversed so that it will contact throughout with the upwardly flared flange 14, but this flange will back up the sealing ring and thus preclude complete removal of the tube under normal operation.

The tube here employed is of the same construction as the "discharge tube 6" of my Patent No. 2,186,083. This tube is provided with a discharge port 30 normally sealed by a slide valve, such as shown in Fig. 8 of said patent. The slide valve is, in said patent, connected to a metal clip provided on its outer end with an annular flange 24 having at its opposite sides bendable tongues 25 normally engaged with a flange 21 at the outer end of the tube for the purpose of locking the slide valve in closed position with respect to the discharge port 30. Near the inner end of the tube is an outstanding stop 15.

With the present construction, the tube is adapted to be slid in and out through the central opening of the rubber sealing ring 12, but the stop 15 will preclude the tube from being pulled all the way out in the normal operation of the structure. To insert or remove the tube from the fixture shown, it must be tilted at quite an angle in order to enter the stop 15 before the main body of the tube is pushed through the ring, when assembling the parts, and to similarly tilt the tube to remove the main body of the tube from the ring before the pin is withdrawn through said opening.

In normal use of the can, as shown in Figs. 3–5, the tube and its mounting are thoroughly sterilized, assembled and positioned, as shown in Fig. 5, within a thoroughly clean and sterile can. A removable dust cap 17 is then pressed into the open top of the cylindrical body 10 and serves to seal the same against the entrance of dirt or any other extraneous matter. The can is then filled with milk and the closure 5a is applied. The filled can is then delivered to the ship where it is stored under refrigerated conditions until use.

When the milk is to be dispensed from a can so constituted, it is removed from the refrigerated storage place and positioned in a cabinet, such as shown in Figs. 1 and 2. This cabinet is illustrated in these figures, in the interest of simplicity, as having a single thickness outer wall 18, although, in practice, it is preferably of double walled construction with appropriate interposed insulation. The front of the casing of the cabinet is closed by a front panel 19 shown as held in place by screws 20. The central portion of this front panel is provided with a square opening 26 positioned with its sides at 45 degrees to the base of the casing. This opening is somewhat larger than the transverse dimensions of the can 1, so that a can may be readily passed through said opening when the can is tilted to substantially horizontal position.

Positioned within the casing and registering with the opening 26 is a walled pocket 27 of rectangular form closed on its four sides and at its back, but open at its front. This pocket is made of sheet metal welded, brazed or otherwise permanently attached to the front panel, the opening 26 of which forms the inlet to the pocket. The front of the pocket is thus supported by the front panel, but the rear end of the pocket may be supported on a bracket 28 secured to the bottom of the casing as shown in Fig. 2. The arrangement is such that the pocket inclines upwardly toward the rear of the casing, as illustrated in this latter figure, so that the can 1, positioned in the pocket as shown in Fig. 2, will be substantially horizontal, but will tilt toward the corner of the can where the discharge tube 6 is located.

Arranged within the casing and preferably mounted on the outer surface of the pocket 27, are a series of refrigerated coils 29. These may be arranged about all four sides of the pocket or along a lesser number of said sides. In any event, they are connected to terminal tubes 31 which lead to a control valve 32. This valve is in practice connected to the remaining parts of a refrigerating system which may, if desired, be enclosed within the casing 18 or within an appropriate subbase associated therewith. When a refrigerant is circulated through the coils 29, heat is withdrawn from the walls of the pocket 27 with resulting cooling or refrigeration of the milk in the can 1 in said pocket.

The front of the casing has a hinged door 33 on which is mounted dispensing mechanism of the character disclosed in my said Patent No. 2,186,083 and in said door is an opening 38 through which the discharge tube 6 may be withdrawn from the can 1 and secured to the dispensing mechanism on the door, whereby the slide valve of the discharge tube may be manipulated at the will of the operator to discharge milk through the discharge port 30 into a drinking glass positioned beneath the same.

In order to permit of satisfactory flow of milk from the can 1, it is essential that air be admitted to the can to displace the liquid drawn therethrough. Consequently, I mount on a rear wall of the pocket 27 a sharp spur 39, so located that it will engage with the bottom of the can near the upper corner thereof when the can is positioned in the pocket 27. As the can is forced rearwardly to a seat in the pocket, the bottom of the can will be impaled by the spur 39, which is preferably of arcuate or irregular cross section, so that the hole thereby punched in the bottom of the can will admit the inflow of air for the purpose stated. To insure proper positioning of the can in the pocket a stop 40 is located at the bottom of the pocket and near its forward end and the can should be forced into the pocket far enough for its lower corner to pass the stop 40 and rest against the inner side of the stop.

In associating the can with the casing, the front hinged door is opened, the can is forced back into the pocket until it is engaged with the stop 40. The dust seal 17 is then removed and the operator is free to reach in, grasp the outer end of the tube 6 and draw it into the position shown in dotted lines in Fig. 2. The door 33 is then closed, the tube is secured to the dispensing mechanism on the exterior of the door and all is then in readiness for the dispensing of milk. Meanwhile the milk in the can is kept cool by the refrigerating system which I have hereinbefore described.

When the contents of the can have been drawn off, the dispensing tube is disengaged from the dispensing mechanism on the door, the door is opened, the can lifted out and thrown overboard, and a full can substituted in the casing.

Milk handled in the manner stated and by the apparatus described is maintained in hygienic and sterile condition and at proper temperatures to insure palatability and freedom of contamination. The use of pitchers or other unsterilized containers is wholly unnecessary as the milk is deposited directly from the sterilized can through sterilized equipment to the drinking glass of the user. The can and its discharge tube are so economical to manufacture that no appreciable cost is added to the present price of the single use cans and the cabinet and the dispensing mechanism thereof are such that no part thereof ever touches the milk. The refrigerating apparatus and the interior of the cabinet are sealed by the front plate against the entrance of dirt, moisture or other extraneous matter, so that no cleaning of the interior of the casing is required. The entire exterior of the casing and its door may be made from stainless steel or other sanitary material which gives a neat and pleasing appearance and provides no harbor for dirt which would render it unsightly or unsanitary.

While the rectangular cans are thus commonly used abroad ship, there are some cylindrical single use cans employed. One of these cans is shown in Fig. 6. Such a can has a cylindrical side wall 41, a slip cover 42 and a closed bottom 43. Handles 44 are usually provided for conveyance in handling the can. I may adapt a can, such as shown in Figure 6, for use with the cabinet shown in my Patent No. 2,186,083 by mounting a dispensing tube after the manner shown in Figure 5, in the side wall 41 of the can of Figure 6, wherein the dispensing tube is indicated. The mounting for the tube in the side wall 41 is identical with the mounting shown in Figure 5, except that it is in the side wall instead of in the top of the can. Such a cylindrical can cannot of course be used with the cabinet of Figures 1 and 2, but it can be used in the cabinet of my said patent. However, before placing the can of Figure 6 in the cabinet of said patent, a hole should be punched in the top wall 42 of the can to permit of the entrance of air. This may be conveniently accomplished by the use of an ice pick. For these reasons I wish it understood that I may use the discharge tube and its mounting of this invention in connection with either a rectangular or cylindrical can without departing from this invention.

The foregoing detailed description sets forth the invention in its preferred practical forms, but the invention is to be understood as fully commensurate with the appended claims.

Having thus fully described the invention, what I claim as new and desire to secure by Letters Patent is:

1. A milk can comprising: a rectangular body having rectangular top and bottom walls, the top wall being provided with a threaded outlet neck near one corner of said wall, a re-entrant cup threaded onto said neck and provided at its inner end with an inturned annular flange, a locking ring provided with a peripheral flange having a forced fit with the interior of the cup, a flat rubber sealing ring seated on said flange with its outer margin clamped between the flange and said locking ring, a discharge tube passing through the central openings of the locking ring and rubber sealing ring, the central opening of the rubber sealing ring being smaller than the outside diameter of the tube and the openings in the locking ring and inturned flanges being larger than the outside diameter of the tube whereby the rubber sealing ring resiliently grips the tube to form therewith a liquid tight joint while permitting axial sliding movement of the tube with concurrent axial bending of the inner margin of said ring.

2. A milk can as claimed in claim 1, wherein the inner margin of the locking ring is flared outwardly to back up and reinforce the sealing ring when the tube is partially withdrawn from the can.

3. A milk can as claimed in claim 1, wherein the discharge tube is cylindrical.

WILLIAM TAMMINGA.

REFERENCES CITED

The following references are of record in the file of this patent:

UNITED STATES PATENTS

| Number | Name | Date |
| --- | --- | --- |
| 483,082 | Payne | Sept. 20, 1892 |
| 2,143,860 | Chamberlain | Jan. 17, 1939 |
| 2,186,082 | Tamminga | Jan. 9, 1940 |
| 2,186,083 | Tamminga | Jan. 9, 1940 |
| 2,291,256 | Rehrig | July 28, 1942 |
| 2,295,967 | Plumb | Sept. 15, 1942 |
| 2,377,261 | Norris | May 29, 1945 |